United States Patent
Schroeder et al.

(10) Patent No.: US 11,652,840 B1
(45) Date of Patent: *May 16, 2023

(54) SYSTEM FOR EVALUATING AND IMPROVING THE SECURITY STATUS OF A LOCAL NETWORK

(71) Applicant: UIPCO, LLC, San Antonio, TX (US)

(72) Inventors: Eric David Schroeder, San Antonio, TX (US); Daniel Christopher Bitsis, Jr., San Antonio, TX (US); Manfred Amann, San Antonio, TX (US); Donnette Moncrief Brown, San Antonio, TX (US); Meredith Beveridge Lecocke, Morrison, CO (US); Michael J. Maciolek, Kerrville, TX (US); Robert Wiseman Simpson, Fair Oaks Ranch, TX (US); Michael P. Bueche, Jr., San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/504,024

(22) Filed: Oct. 18, 2021

Related U.S. Application Data

(63) Continuation of application No. 16/560,187, filed on Sep. 4, 2019, now Pat. No. 11,184,386.
(Continued)

(51) Int. Cl.
  *G06F 21/00* (2013.01)
  *H04L 9/40* (2022.01)

(52) U.S. Cl.
  CPC .......... *H04L 63/1433* (2013.01); *H04L 63/02* (2013.01); *H04L 63/083* (2013.01); *H04L 63/0884* (2013.01)

(58) Field of Classification Search
  CPC ............. H04L 63/1433; H04L 63/0884; H04L 63/083; H04L 63/02
  See application file for complete search history.

(56) References Cited

U.S. PATENT DOCUMENTS

| | | | |
|---|---|---|---|
| 10,922,423 B1* | 2/2021 | Rungta | G06F 21/604 |
| 2007/0180509 A1* | 8/2007 | Swartz | G06F 9/4406 |
| | | | 726/9 |

(Continued)

OTHER PUBLICATIONS

Fredrik Heiding, Emre Süren, Johannes Olegård, Robert Lagerström, Penetration testing of connected households, Computers & Security, 2022, 103067, ISSN 0167-4048, https://doi.org/10.1016/j.cose.2022.103067. (https://www.sciencedirect.com/science/article/pii/S016740482200459X). (Year: 2022).*

*Primary Examiner* — Kendall Dolly
(74) *Attorney, Agent, or Firm* — Plumsea Law Group, LLC

(57) ABSTRACT

A system and method for evaluating and improving the security of a local area network including an application residing on an external server configured to conduct a penetration test of the local area network by interrogating each of the devices on the local area network to identify vulnerabilities and risks associated with those devices, receiving a report listing all such identified vulnerabilities and risks, calculating an IoT readiness score for the local area network, and undertaking and/or recommending specific actions for improving the security of the local area network.

20 Claims, 12 Drawing Sheets

Related U.S. Application Data

(60) Provisional application No. 62/751,279, filed on Oct. 26, 2018.

(56) References Cited

U.S. PATENT DOCUMENTS

| | | | |
|---|---|---|---|
| 2016/0014156 A1* | 1/2016 | Roosli | H04L 63/20 726/1 |
| 2016/0134650 A1* | 5/2016 | Farmer | H04L 63/1433 726/23 |
| 2019/0007447 A1* | 1/2019 | Barnes | H04L 63/306 |
| 2019/0132347 A1* | 5/2019 | Wakid | H04L 1/203 |
| 2019/0258805 A1* | 8/2019 | Elovici | G06F 11/261 |

* cited by examiner

SYSTEM FOR EVALUATING AND IMPROVING THE SECURITY STATUS OF A LOCAL NETWORK

CROSS-REFERENCE TO RELATED APPLICATIONS

This application is a continuation of and claims priority to U.S. patent application Ser. No. 16/560,187, filed Sep. 4, 2019 and titled "System for Evaluating and Improving the Security Status of a Local Network", which application claims the benefit of U.S. Provisional Patent Application No. 62/751,279, filed Oct. 26, 2018, and titled "System for Evaluating and Improving the Security Status of a Local Network," the disclosures of which applications are incorporated by reference herein in their entirety.

TECHNICAL FIELD

This disclosure relates generally to systems for evaluating and improving the security status of local area networks.

BACKGROUND

Local area networks are now commonplace in peoples' homes, offices, hotels and other business locations. Such networks generally have a router that may be connected to the internet. In many cases, the router then connects wirelessly or over cables or wires to various devices in the home or office or other business location.

FIG. 1 is an example of such a local area network, in this case a home local area network. As shown in FIG. 1, the home network 100 has a wireless router 102 that receives communications over the internet via, for example, a cable network or a satellite system. Wireless router 102 then connects wirelessly or over cables or wires to various devices in the home, including, in this example, a laptop computer 104, a wireless printer 105, a television set 106, a mobile phone 116 and a cordless phone 114. In some homes with more extensive use of wirelessly communicating devices, the wireless router may also communicate with appliances such as washing machine 108, microwave oven 110, refrigerator 112 and garage door opener 118. Also, in some cases the home owner may have installed various security devices such as a front door lock 120 that may be remotely operated or a front door video camera 124. The homeowner may also want to remotely monitor the status of a sump pump 132 in the basement 130 of the house, or remotely check on water consumption via a wirelessly connected water meter 122. Other security sensors, which are not shown in FIG. 1 may include a moisture sensor in the attic for detecting roof leakage and/or a baby video monitor that may communicate wirelessly via the home network router 102 with, for example, the homeowner's mobile phone 116.

Because external systems and devices such as cable television networks, search engines, mobile phones and other external systems and devices communicate through the home network router with at least some of the devices described above, the network system as a whole as well as many of the devices on the network are potentially vulnerable to being hacked by external actors with malicious intent.

SUMMARY

In one aspect, the invention includes a system for evaluating and improving the security of a local area network. The system can include an application residing on a server external to the local area network, the application can be configured to receive a trigger with an IP address of a router associated with the local area network; obtain or create a list of all devices in communication with the router; conduct a penetration test of the local area network by interrogating each of the devices on the local area network to identify those devices that pose a security risk; report results of the interrogation of each of the devices on the local area network. The system may also perform one or both of the following tasks as necessary: undertake an action that improves the security of certain of the identified devices; recommend an action that would improve the security of certain of the identified devices; and/or calculate and report an Internet of Things readiness score for the local area network.

In other aspect, a method for evaluating and improving the security of a local area network can be executed on an external server. The method can include the following steps: receiving a request from a user to conduct a penetration test of a local area network, the request including an IP address of a router on the local area network; conducting a penetration test of the local area network by interrogating each of the devices that are in communication with the router over the local area network; identifying each of the devices on the local area network that pose a security risk; identifying any unauthorized devices having access to the local area network; reporting the identification of devices that pose a security risk. The method may also take at least one of the following actions: blocking access of unauthorized devices to the local area network; updating outdated firmware on one or more devices on the local area network; identifying devices that still carry their manufacturers' default Admin passwords, and either changing the Admin password and storing the changed password in a password vault or recommending changing the Admin password; and calculating and reporting an Internet of Things readiness score for the local area network.

In other aspect, a method for evaluating the IoT score of a local area network can include the steps of: receiving an IP address of a router in the local area network at an external server with instructions to conduct an IoT penetration test of the local area network from a person authorized to request the penetration test; initiating at the external server the penetration test of the local network, the penetration test comprising: probing through the router to identify each of the devices on the local network; identifying any vulnerabilities associated with any of the devices on the local area network; evaluating the IoT readiness score of each of the identified devices; providing a list of the devices to the external server together with the IoT readiness score for each of the devices; calculating in the external server an IoT readiness score for the local network and reporting the IoT readiness score to the person initiating the penetration test; and recommending remedial action to correct any identified vulnerabilities associated with any of the devices on the local area network.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems

DESCRIPTION OF EMBODIMENTS

The embodiments disclosed herein provide a system and method for assessing the vulnerability of a local area network and of the devices on the network, and of improving the security of the network and the devices. The term the "Internet of Things" or "IoT" as used herein refers to the interconnection via the Internet of computing devices embedded in everyday objects, such as the objects shown in HG. and described above, enabling them to send and receive data. The vulnerability of a local area network to malicious hacking attacks may be calculated and reported as an IoT score. The goal of the embodiments disclosed herein is to improve the local area network by minimizing its vulnerabilities and its exposure to hacking and thus to improve its IoT score. Such an improved score may benefit the home owner or other person responsible for the local area network by protecting the user and by demonstrating that a higher level of security has been obtained for the local area network.

Figure 2:
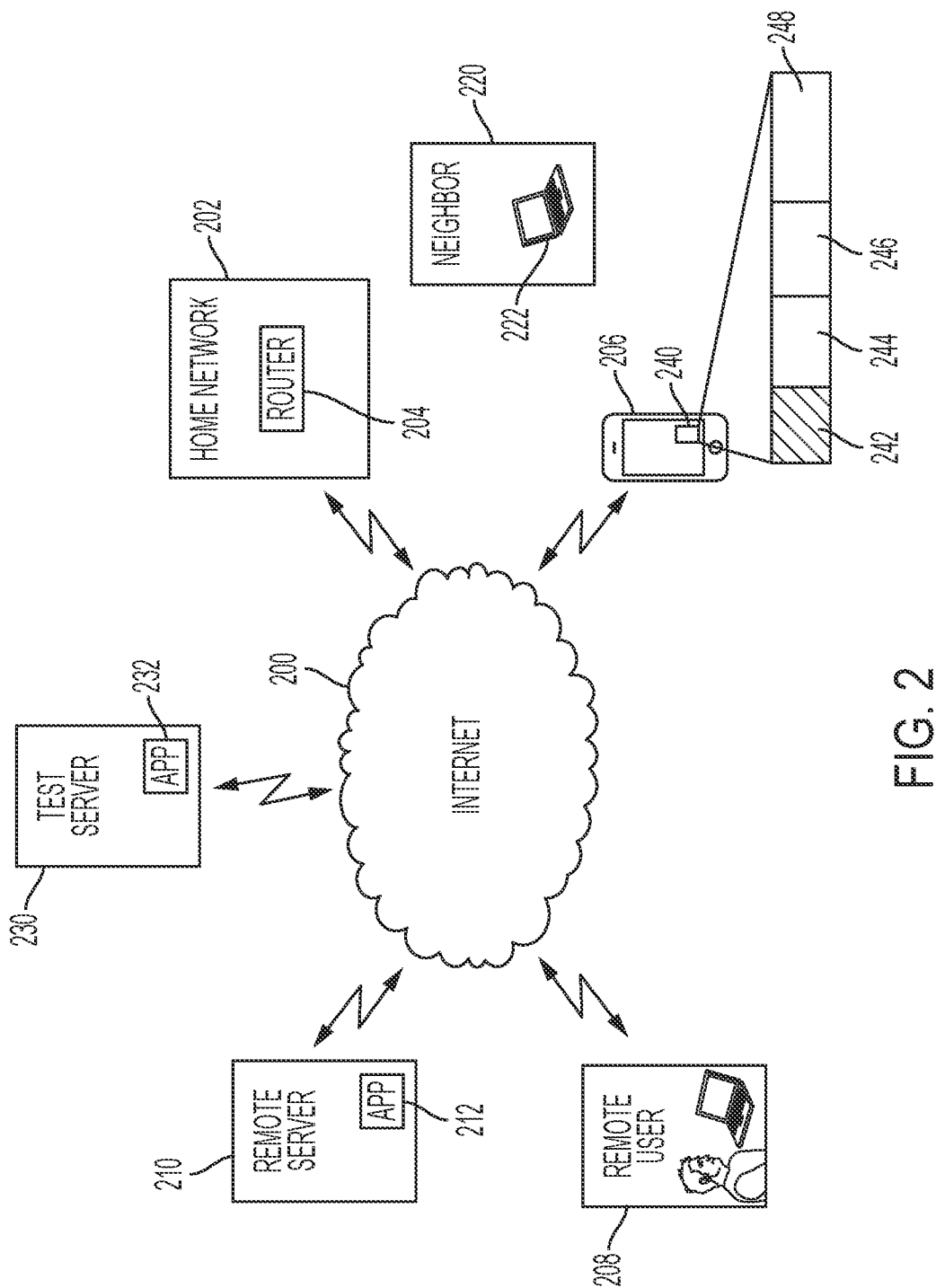
FIG. 2 is a block diagram illustrating exemplary communications over the Internet between the local area network and various remote devices.
Figure 4:
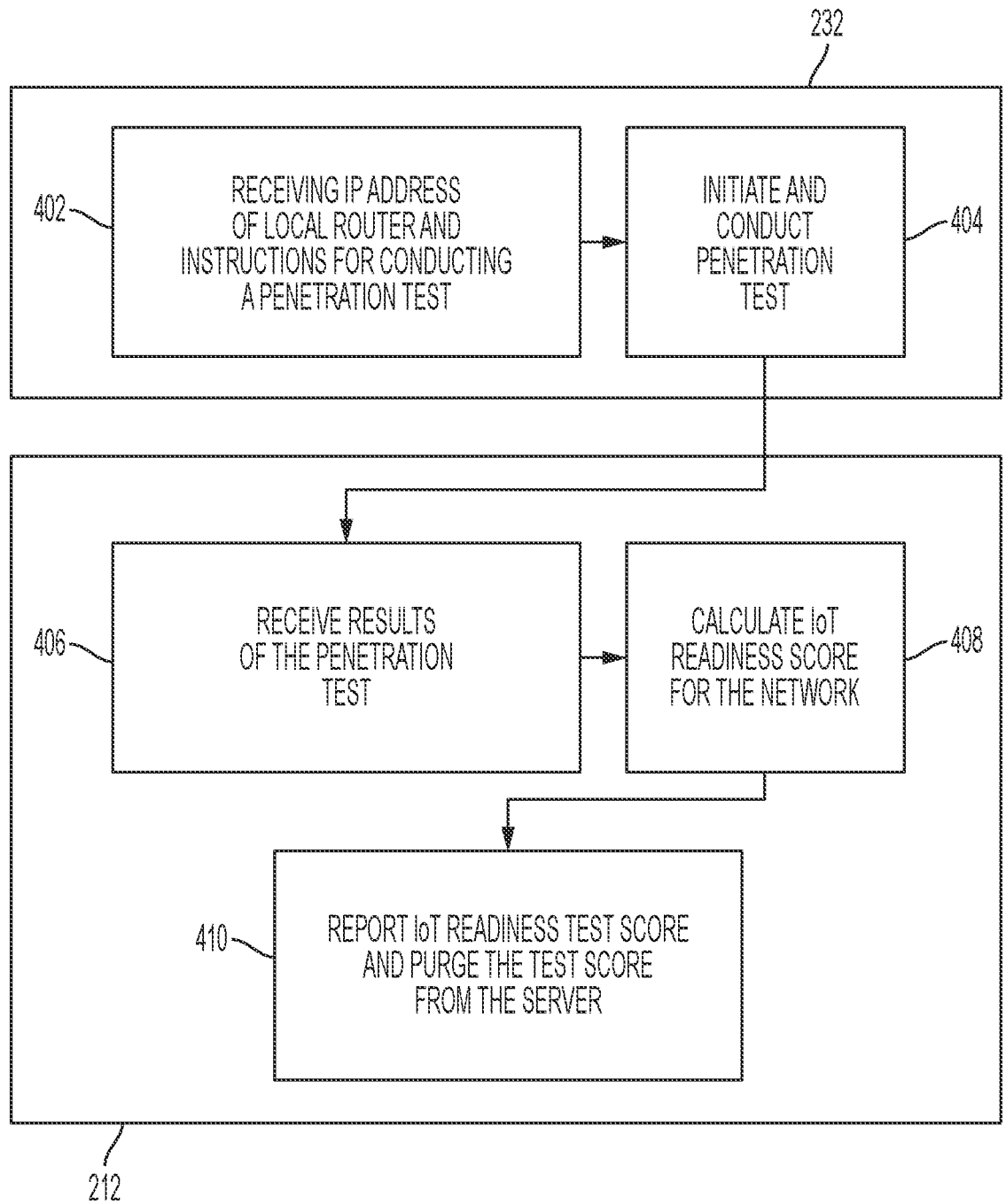
FIG. 4 is a block diagram illustrating an exemplary description of functional modules that may be used in certain of the embodiments described herein.

FIG. 2 discloses applications or "apps" 232 and 212 residing in the remote servers 230 and 210, respectively, that would be configured to conduct and evaluate penetration tests of local area networks over the Internet 200, using, for example, the modules described in FIG. 4. Such penetration tests may be initiated by, for example, the homeowner or business owner or by some other person authorized to initiate the test (collectively, referred to herein as "the user"). Generally, because the user must be authorized to request that the penetration test be conducted, app 232 may require the user to provide a password or make the request from a specific validated device before initiating the penetration test or both. Essentially, app 232 has the same access as a hacker, once it is provided with the IP address of the router on the local network, so that it may access all of the devices that a hacker might attempt to access.

App 232 may be triggered, for example, from the user's mobile phone 206, or by the user from a remote location 208. App 232 would be provided the IP address of local network router 204 and instructed to conduct a penetration test via local network router 204. App 232 may then obtain from the network router a list of all devices that are active or have been active on the local network. In some cases, one or more devices might communicate through a wireless hub to the local network router or may even be connected to the router using a cable. In all cases, app 232 would then conduct a penetration test (or "Pen Test") to interrogate each of the devices (including router 204) to determine its operating parameters and characteristics, such as the ages of the devices, the date of any firmware installed on the device and/or the date on which that firmware may have been updated; and any passwords, encryptions or other security protocols stored on the devices or used to access the devices, and the quality of those passwords and security protocols.

Figure 1:
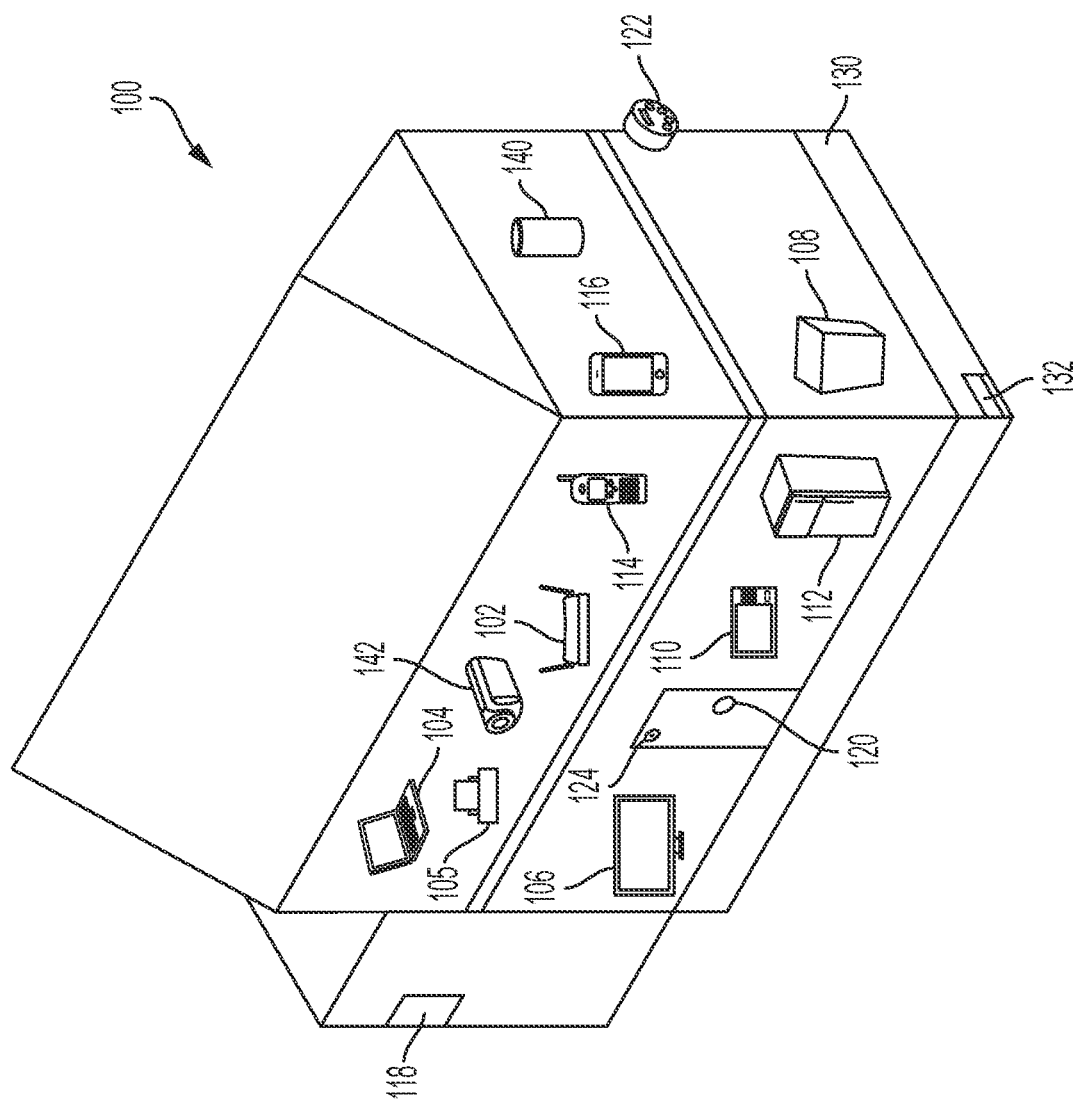
FIG. 1 is a schematic diagram of an exemplary home network.
Figure 3:
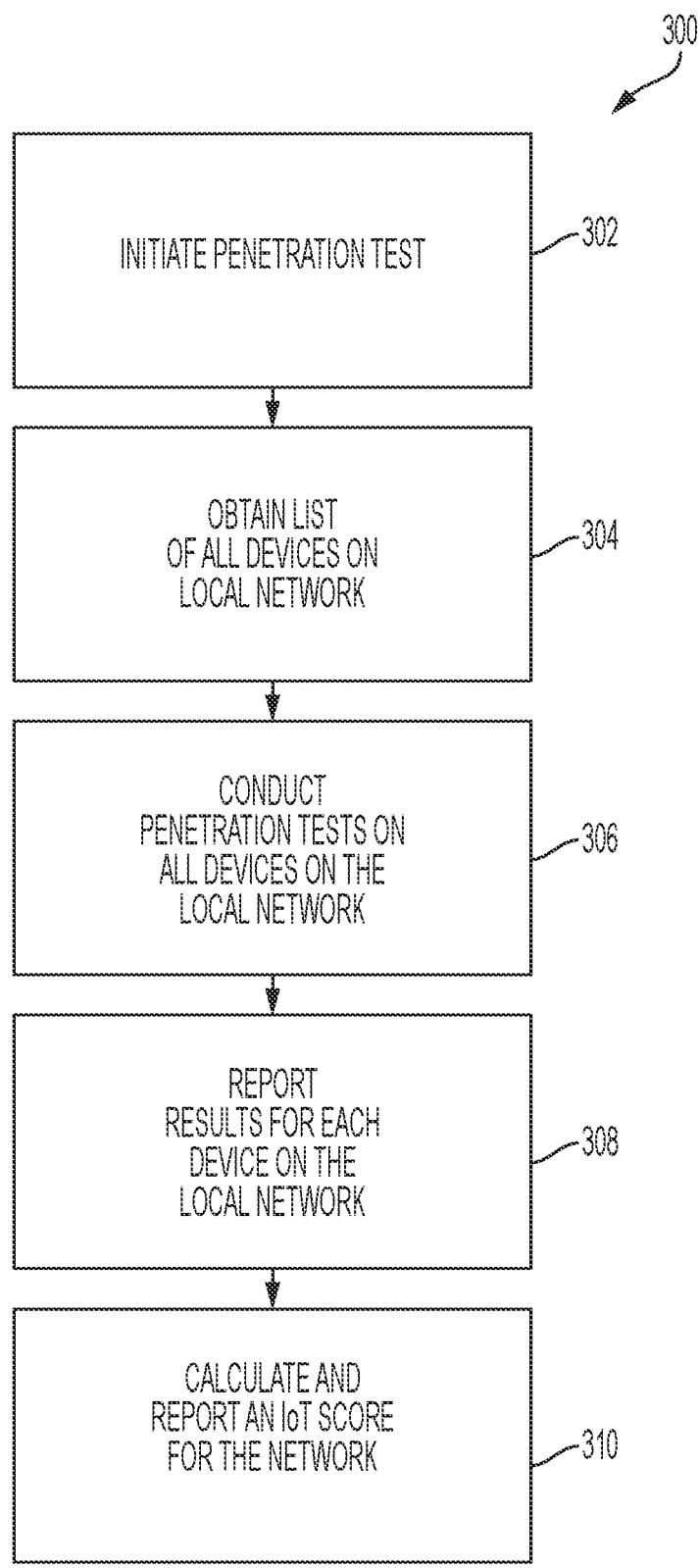
FIG. 3 is an exemplary flowchart showing how one or more applications housed in one or more servers can conduct a penetration test on a local area network.

FIG. 3 shows an exemplary set of steps that may be used to conduct and evaluate the penetration test 300. The process may include a step 302 in which app 232 receives a trigger from the user to initiate the penetration test, the trigger including the IP address of the local area network router 102 on the local area network 100. App 232 would then obtain or create a list of all the devices connected wirelessly, through a hub or through a cable to the local area network router 102 in step 304. App 232 may obtain the list from the router 102 itself, or it may create the list by interrogating all connections to router 102. Then, in step 306, app 232 would conduct penetration tests on all of the devices on the list. For example, for the home illustrated in the schematic diagram shown in FIG. 1, app 232 would conduct penetration tests for router 102 itself, and for each of the devices that were in communication with router 102. In step 308, which is optional, app 232 may report the results of the penetration tests for each of the devices on local area network 100 to app 212, or possibly only for a subset of the devices on local area network 100. Finally, in step 310, app 212 calculates and reports an IoT readiness score (or IoT score) for the local area network 100.

FIG. 4 illustrates functional modules in app 232 and app 212 that may be used to conduct a penetration test and calculate an IoT readiness score for local area network 100. These functional modules may include, for example, a first module 402 for receiving the IP address of the local network router 101 on the local network 100 and instructions for initiating the penetration test from the user. App 232 may include a second module 404 for initiating and conducting the penetration test. App 212 may include a third module 406 for receiving the results of the penetration tests. App 212 may also include a fourth module 408 for calculating an IoT readiness score for the local area network 100, and a fifth module 410 for reporting the IoT readiness score to the user and then purging that IoT readiness score from the external server.

Figure 5:
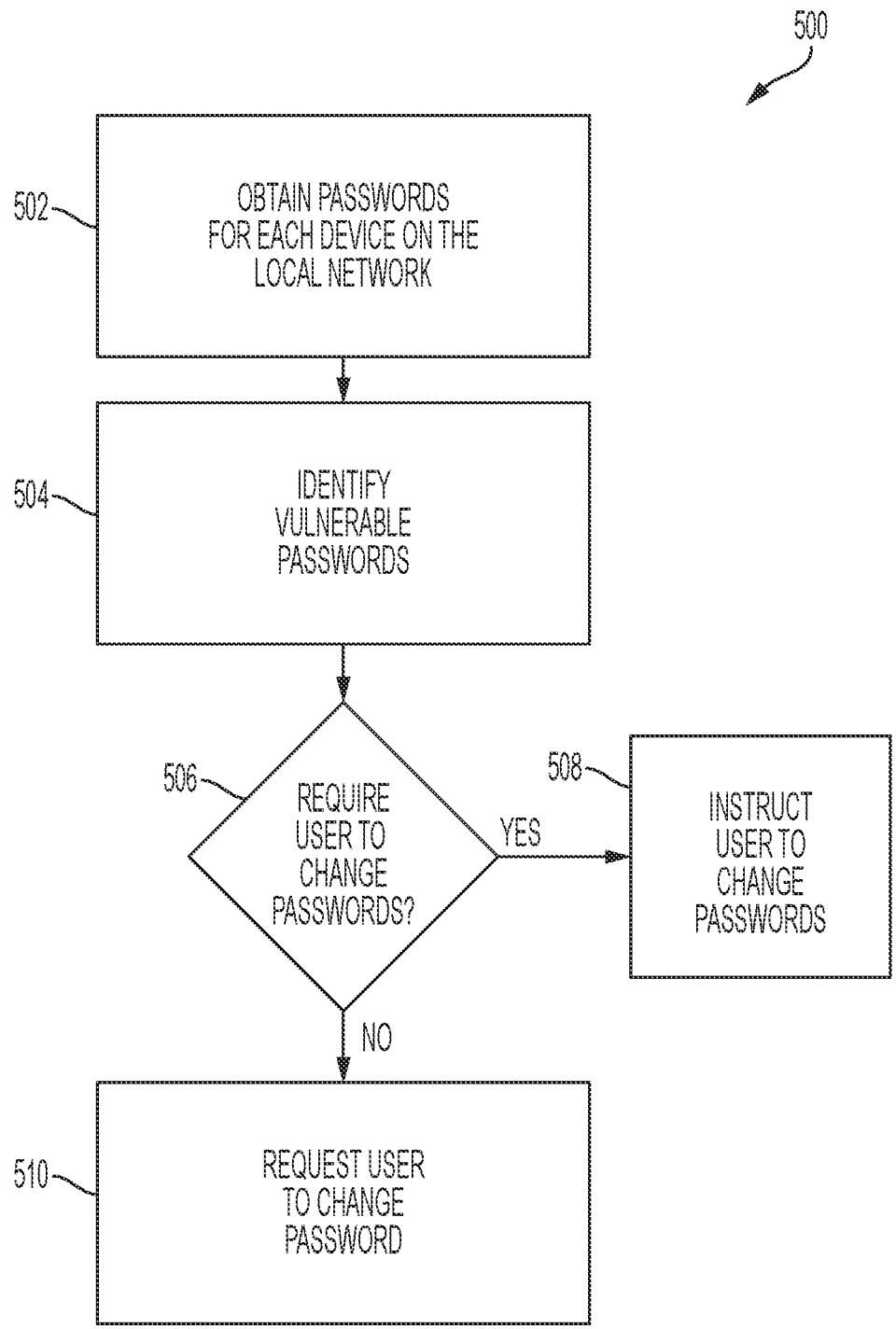
FIG. 5 is an exemplary flowchart showing the process used to identify passwords on the device accessed via the network to determine whether these passwords need to be updated.

In some embodiments, app 232 and/or app 212 may identify passwords on certain devices that are vulnerable to hacking. These passwords may have been provided by the manufacturer of the device as default passwords, but were not changed by the user when the device was installed in the home or other location. In other cases, a user may be using an easily ascertainable password such as "1234", "ABCD", or his or her birthday as the password on some devices. As shown in FIG. 5, in step 502 app 232 and/or app 212 would obtain the passwords used by each device on the local area network 100, i.e., each device connected to local area network router 102. In step 504, app 232 and/or app 212 would identify passwords that it may determine are vulnerable to hacking attacks. In step 506, app 232 and/or app 212 determines whether it may require the user to change the password or whether it may only request that the user changes the password. If app 232 and/or app 212 may require the user to change the password to a less easily ascertainable password, it does so in step 508. If not, app app 232 and/or 212 in step 510 only requests that the user change the password to a less easily ascertainable password.

Once this process is completed for all the devices on the local network, the app may calculate an IoT readiness score which can then be used to evaluate the security of the local network. In some cases, the user may report a favorable IoT score to his or her insurance company, so that his or her insurance rates may more properly reflect his more limited exposure to losses due to hacking attacks. In addition to the recommendation to install less easily ascertainable passwords in the devices connected to the local network router, app 212 may also recommend other changes or corrections to the user of the local network, or may even implement these changes or corrections itself. In either case, the embodiments described herein would result in a local network with improved security that is less vulnerable to hacking attacks.

In some cases, a local area network may also have, for example, a guest network associated with the local area network. The guest network may be accessed through the same router as the local area network, or it may be accessed through a separate router. If the guest network can be accessed through the same router as the local area network, then app 232 may conduct the penetration test on the guest network using the local area network router's IP address. However, if the guest network must be accessed through a different router having a different IP address and the IP address of the guest network router is known, then app 232 may conduct a penetration test of the guest network using the same protocols and methods described herein for the local area network. If the IP address of the router for the guest network is not known, in some cases app 232 may be able to identify the IP address of the guest network based upon, for example, the signal strength and/or location of the guest network router. In that case, once the IP address is determined, app 232 may conduct a penetration test on the guest network as described above. In all of the above scenarios, the user must be authorized to have such penetration tests conducted on the guest network as well as on the local area network. Also, in many cases, there may be considerable overlap between the devices on the guest network and the local area network. For example, several of the devices on the local area network (such as printers and scanners) may be shared between the local area network and the guest network. The results of the penetration tests may be reported to app 212, for example, which can then calculate separate IoT scores for the local area network and the guest network, and/or app 212 may calculate a combined IoT score for the combination of the local area network and its associated guest network.

Figure 6:
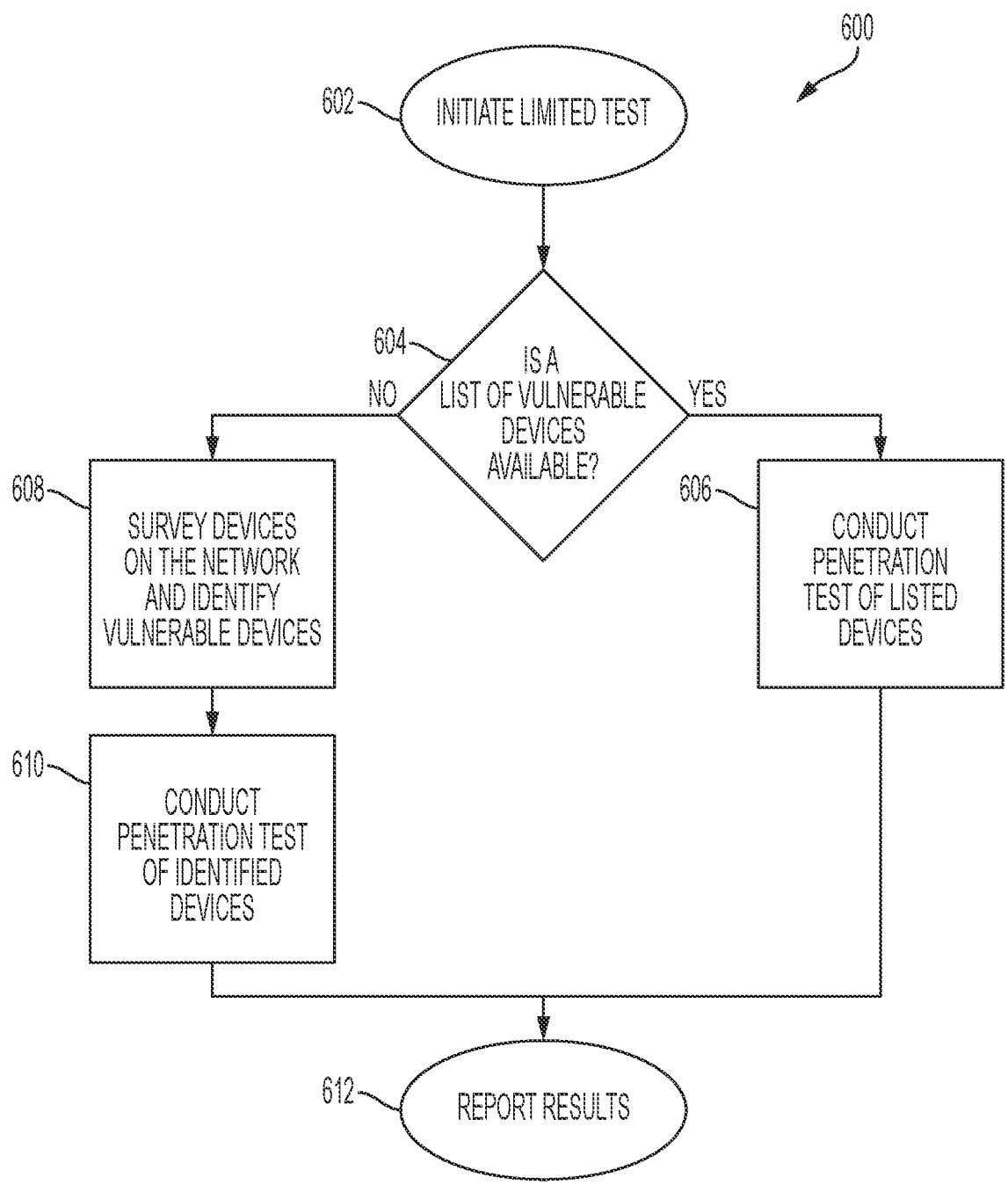
FIG. 6 is an exemplary flow chart showing how the system can minimize service interruption, service interference or service downtime on the local network by only interrogating devices on the network that were identified as being more critical than other network devices.

In some cases, the apps may conduct a more limited test of only selected more vulnerable devices, to minimize any disruption of the network during the penetration test. This process is shown in the flow chart 600 shown in FIG. 6. App 232 would receive instructions to conduct only a limited penetration test in step 602. App 232 could work from a list of the selected devices provided by the user, or it could make its own determination of which are the most vulnerable devices on the local network. Thus, in step 604, app 232 determines whether a list of the selected devices has been made available by the user. If so, in step 606 app 232 conducts penetration tests for each of the devices listed by the user, then reports those results in step 612. If not, then app 232 (or possibly app 212) surveys all the devices on the local area network and identifies those devices that are the most vulnerable devices. App 232 then in step 610 conducts penetration tests on the identified devices, and reports the results in step 612.

Figure 7:
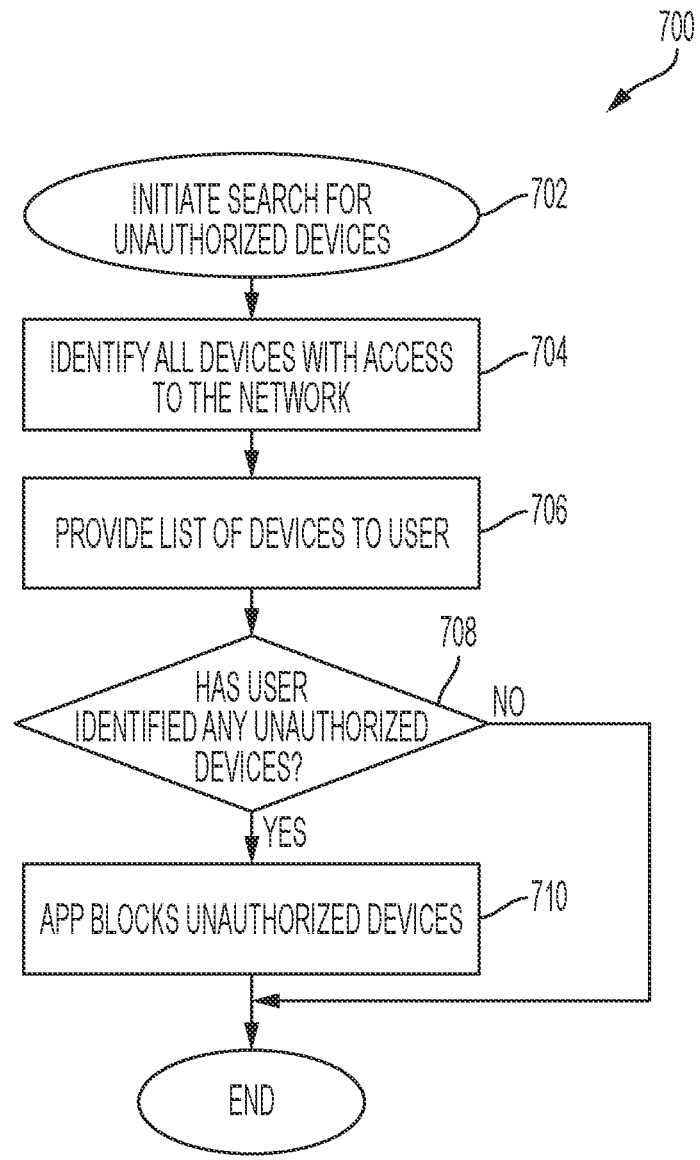
FIG. 7 is an exemplary flowchart showing the actions that the system may take if it sua sponte detects unauthorized devices on the network.

This process could also be used to identify any unauthorized users of the local network. For example, a neighbor 220 may be accessing a homeowner's local area network using a laptop 222. That is a clearly dangerous situation since, even if the neighbor is not acting out of any particular malice, he or she may be exporting malware or a virus from his or her laptop to the homeowner's local network 100 and on to the devices on that network. For example, as shown in the flow chart 700 of FIG. 7, app 232 may initiate a search for unauthorized devices in step 702. Then, after conducting its initial identification of the devices on the local network in step 704, app 232 may provide the user with a list of the devices found to have access to the local network in step 706. The user can then identify any device that is not authorized to be on the local network, so that the app can block access by those unauthorized devices in step 708. If no unauthorized devices are so identified, the process reaches an end. However, if one or more unauthorized devices are identified, app 232 may block such unauthorized devices in step 710 from having access to the local area network 100.

Figure 8:
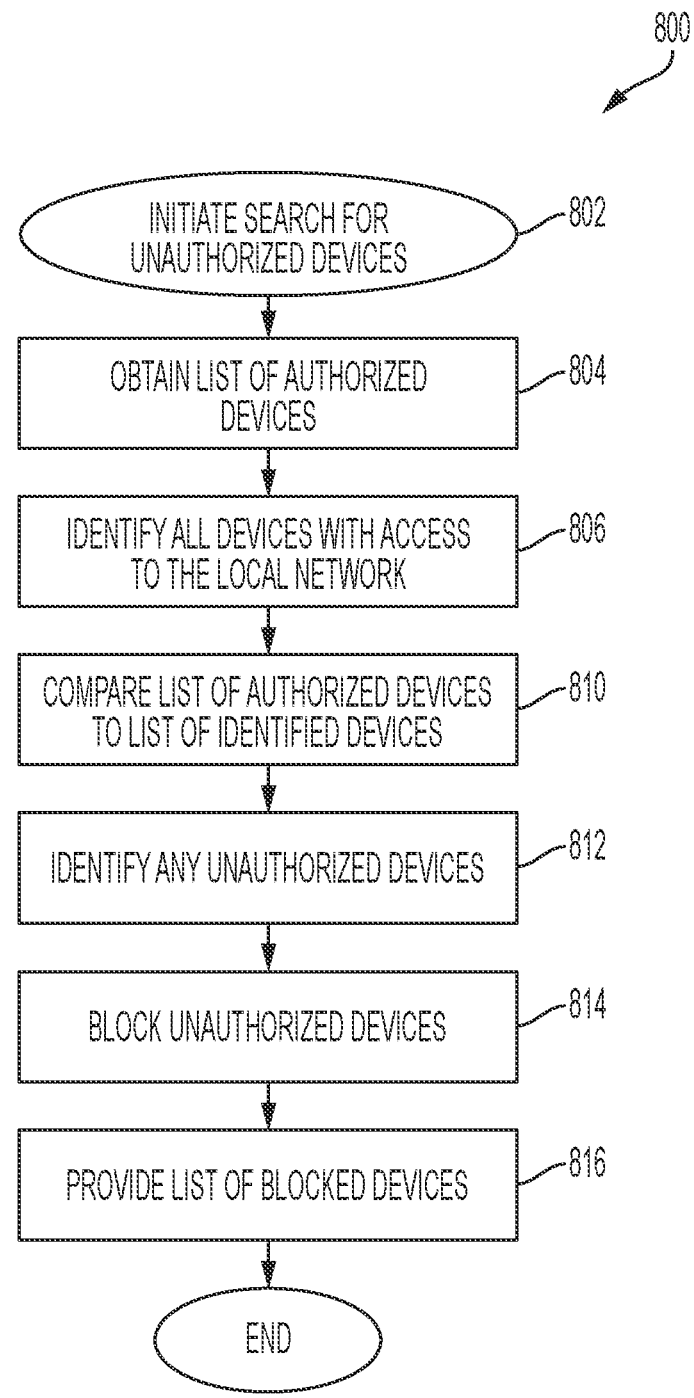
FIG. 8 is an exemplary flowchart showing the actions that the system may take when the user provides an app with a list of authorized devices.

Alternatively, as shown in FIG. 8, the user may a priori provide app 232 or app 212 with a list of authorized devices, in which case app 232 may automatically block network access for those devices which are not on the list. As shown in flowchart 800 in FIG. 8, app 232 may initiate the search for unauthorized devices in step 802 and obtain a list of authorized devices in step 804. In step 806, app 232 may identify all the devices having access to local network 100. In step 810, app 232 or app 212 may then compare the list of the devices it identified to the list of authorized devices obtained in step 804, and then identify any unauthorized devices in step 812. In step 814, app 232 would block each of the unauthorized devices from having access to the local area network 100. In step 816, which is optional, app 232 and/or app 212 may provide a list of blocked devices to the user, in case the user may decide that those devices should be unblocked.

Figure 9:
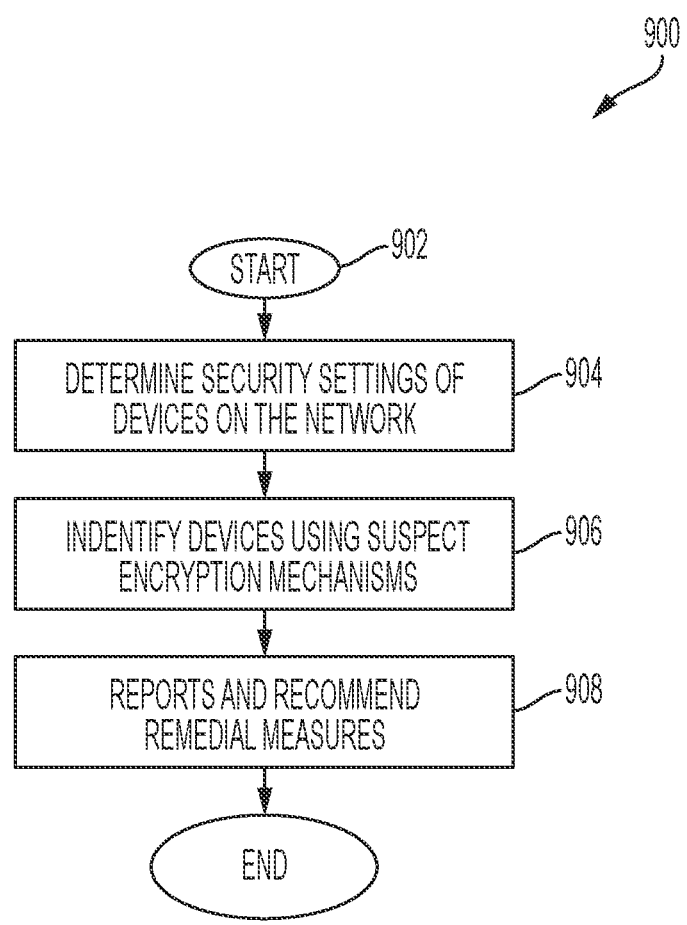
FIG. 9 is an exemplary flowchart showing an app identifying devices that use security mechanisms whose encryption mechanisms have been broken, reports their presence, and recommends updating encryption mechanisms or replacing those devices.

FIG. 9 is a flowchart describing an embodiment in which the apps may identify devices that use security settings such as early versions of WEP and WPA2 or other security protocols whose encryption mechanisms have already been broken and therefore do not provide adequate security. The apps would report the presence of such inadequate encryption mechanisms and recommend that the user replace or update those devices. The apps would start the process at step 902. At step 904, the apps may determine which security settings or protocols are used on devices on the local area network. For example, the apps may identify the encryption level of the router, such as whether the router uses WEP or WPA2 encryption. In step 906, the apps may identify those devices that have security settings or protocols that are vulnerable, for example because they are using suspect encryption mechanisms. In step 908, app 212 reports the identification of those devices that have vulnerable security protocols, and recommends replacing the devices or obtaining updated security settings or protocols for those devices.

Some devices such as a printer, for example, allow an administrator to access the device through a port (e.g., port 80) using an Admin password. The printer, for example, generates a web page that can be accessed from external devices through the Admin entry port such as port 80. Since many users may not even be aware that access to their devices may be possible via an Admin entry port, they would not have known to change the Admin password from their default values. The default values for these Admin passwords are often publicly available, which may enable someone to access the device using the publicly available default Admin password (in case the user did not change the Admin password upon installing the device). The user could also curate a list of pre-validated devices that are allowed to access these admin web pages.

Figure 10:
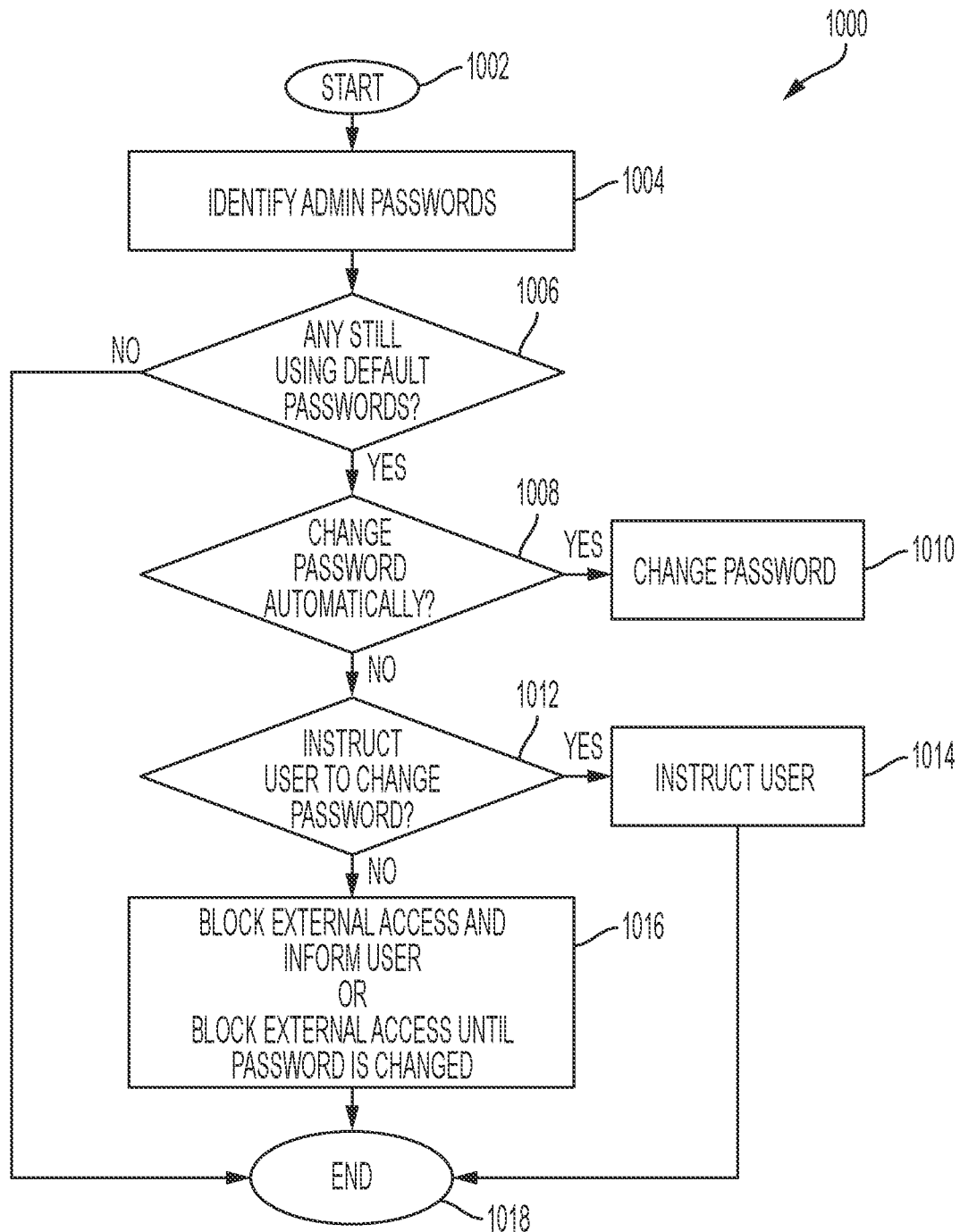
FIG. 10 is a flowchart showing an app determining whether publicly available default passwords have been changed by the user, and/or whether the user has input an easily guessed password such as his birthday or "1234" and taking or recommending actions to correct the issue.

FIG. 10 shows how one or both of apps 212 and 232 can determine whether the publicly available default values for the Admin passwords have been changed. The process starts in step 1002. In step 1004, the app identifies those devices that have Admin passwords that allow an administrator access to the device. In step 1006, the app determines whether the devices are still using the default Admin passwords provided by the manufacturers of the device. If the Admin password is no longer being used, the process stops at step 1018. If the default Admin password is still being used, the app determines if the Admin password can be changed automatically in step 1008. In that case, the app changes the password in step 1010. The app may the store the new password in a location that may be accessed by the user, such as a password vault. If the app determines that it is authorized to instruct the user to change the password, it does so in step 1014. Otherwise, in step 1016 the app may block external access to the device and inform the user it has done so, or alternatively it may block external access to the device until the password is changed.

For clarity and simplicity, FIG. 10 only shows one flow once a device has been identified as still using a default password. It should be noted that once step 1018 has been reached by any of the various routes shown in FIG. 10, the process may start again at step 1006 until all devices have been checked for the use of default passwords.

To summarize the process shown in FIG. 10, if the default Admin password have not been changed, the app could (1) change the password and provide the user with the new password (possibly using a password vault, as described below), (2) instruct the user to change the Admin passwords on certain devices, (3) block external access to the Admin port and inform the user that it has done so, or (4) block all access to the admin port until the password has been updated. For some devices that do not need to communicate outside the local area network, the app may simply block all external access to the Admin port (especially if the device broadcasts that it has an admin web page). This approach could also be used if the user has changed the default Admin password to an easily ascertainable password.

Figure 11:
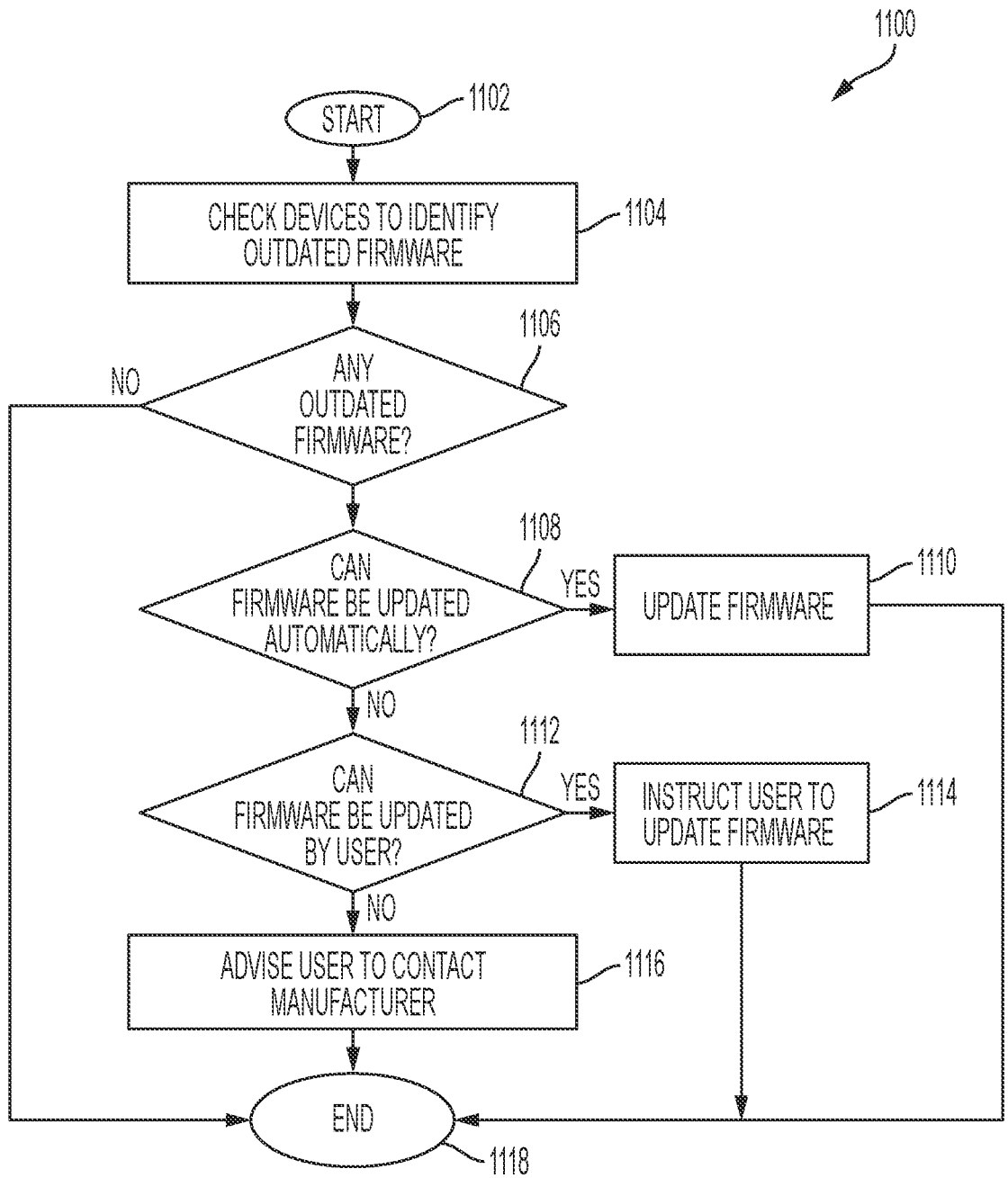
FIG. 11 is a flowchart showing the steps taken to determine if the firmware on a device is outdated, and the action taken in response to this determination.

In some cases, a device is vulnerable because the firmware on the device has not been updated as recommended by the manufacturer of the device. FIG. 11 is a description of how app 212 and/or app 232 could determine if the firmware on a device is outdated, and what action that may be taken in response to this determination. The process for determining whether firmware on a device may need to be updated starts at step 1102. In step 1104, app 232 checks the devices on the local area network 100 to identify which devices have outdated firmware. In step 1106, app 232 or app 212 determines whether any outdated firmware has been detected. If no outdated firmware has been detected, the process ends at step 1118. For each detected outdated firmware, app 232 or app 212 determines whether that firmware can be updated automatically in step 1108. If so, the firmware is updated in step 1110. If not, app 232 or app 212 determines if the firmware can be updated by the user. If the user can update the firmware, app 212 instructs the user to do so. If not, app 212 advises the user to contact the manufacturer of the device to have the firmware updated or replaced.

As a general rule, the network should confirm the authenticity of any firmware update received from an OEM before allowing that update to be installed in any of the devices on the network. For example, the network may require the updated firmware to be digitally signed by the OEM before it may be automatically installed in any device on the network. Possibly, a hash comparison may be used to ensure that the firmware that is received is in fact the correct version of the OEM firmware and not a cleverly disguised man-in-the-middle attack. The network's IoT score may depend on whether it requires updated firmware to be digitally signed by the OEM and/or whether it uses a hash comparison to ensure that any updated firmware it receives is in fact authentic.

For clarity and simplicity, FIG. 11 only shows one flow once a device has been identified as using outdated firmware. It should be noted that once step 1118 has been reached by any of the various routes shown in FIG. 11, the process may start again at step 1106 until all devices have been checked for the use of outdated firmware.

To summarize the process illustrated in FIG. 11, the actions that app 212 and/or app 232 may take may include (1) updating the firmware automatically, (2) requesting permission from the user to update the firmware; or (3) if the firmware cannot be updated, advising the user to contact the manufacturer of the device and request that the firmware be updated.

Figure 12:
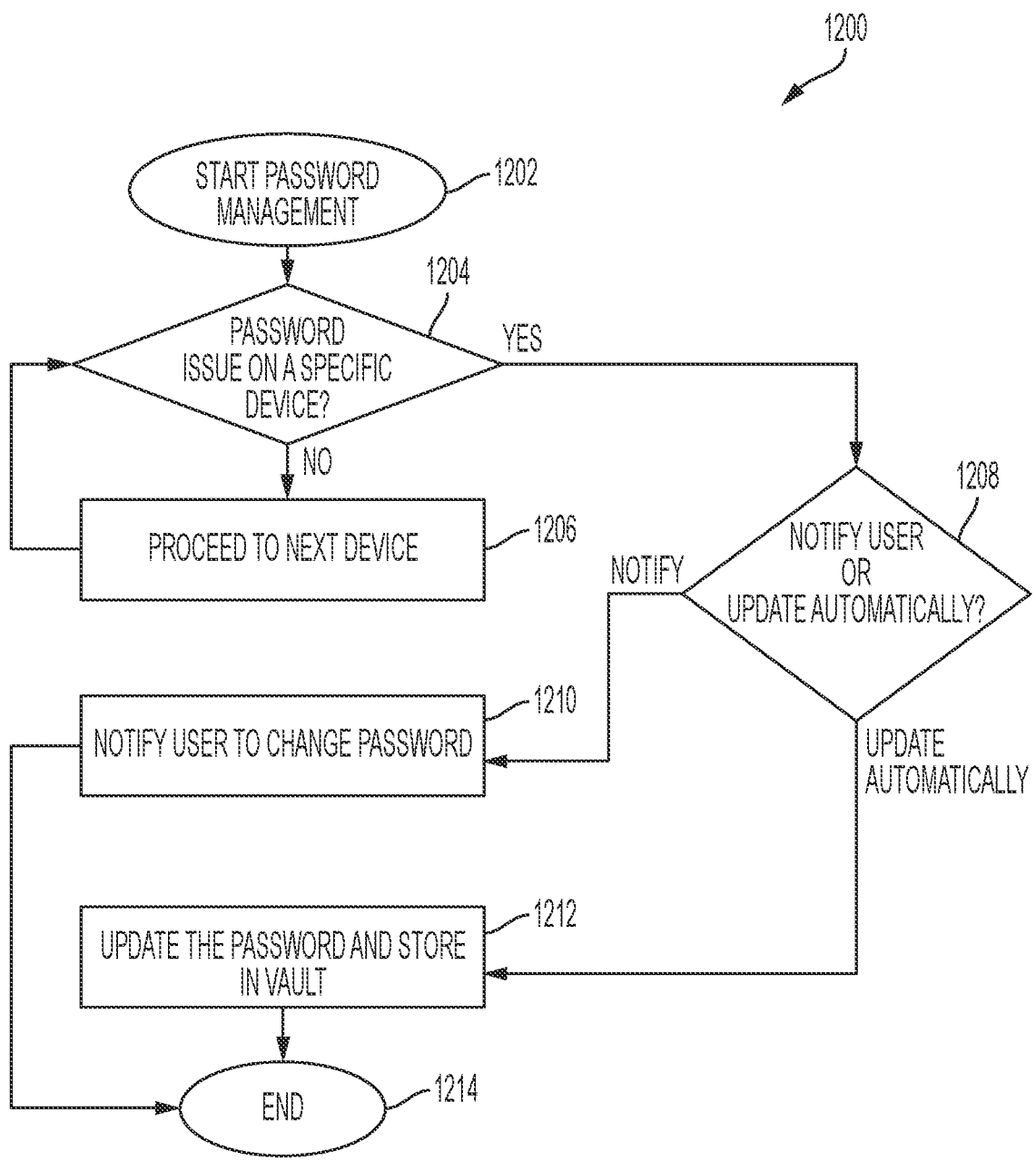
FIG. 12 is a flowchart showing password management using a password vault.

Embodiments of methods to improve the security of a home network may include a password management process, as illustrated in FIG. 12. Step 1202 starts the password management process. In step 1204, the app determines whether it has identified any password issue (such as those described above) on any specific device. Examples of password issues include cases in which an inadequate password has been identified, either in the device as normally operated by the user or by the presence of a default Admin password. If no password issues are identified in a specific device, the app then proceeds to the next device on the network in step 1206 and returns to step 1204. If a password issue is identified for a specific device, the app determines if it should notify the user to change the password in step 1208 (and then notifies the user in step 210) or whether it should update the password automatically and then store the updated password in a password vault in step 1212.

For clarity and simplicity, FIG. 12 only shows one flow once a password issue has been identified on a specific device. However, it should be noted that once step 1214 has been reached by any of the various routes shown in FIG. 12, the process may start again at step 1204 until all devices have been checked for the identification of password issues.

For some devices, app 212 may notify the user that he or she may need to use a new password, but leave it up to the user to change the password and check again within 10 days, for example. This option would apply to devices that are used regularly and, if hacked, might provide a hacker with access to valuable information.

For devices (such as a sump pump, for example) that do not have financial or medical or employment information, and which the user would not normally need to access often, app 232 or app 212 might automatically generate a new password and store that password in a password vault. The user would have access to the password in the vault in the relatively few times he or she would need to do so.

Also, either in conjunction with the password vault or independent of the password vault, app 232 or app 212 may check whether passwords are automatically or manually rotated every, e.g., 30 days. Rotation of passwords would generally improve the IoT readiness score of the local network. The password vault may be, for example, stored in a tamper-proof area on the user's mobile device. The tamper-proof area may be, for example, a Trusted Platform Module (TPM), a Trusted Execution Environment (TEE) or a Secure Element (SE). It may be accessible under, for example, Fast Identification Online (FIDO) protocols using a biometric/PIN to unlock the password vault.

The home network's security may also be enhanced by storing a white list in a secure location (either on a device on the home network, in a vault or on an external device) of only those devices that are allowed to communicate with external devices, and/or a black list of devices that are not allowed to communicate with external devices.

In some embodiments, app 212 and/or app 232 and/or another app may block all external access to certain devices. These would be devices that don't need to receive communications from the outside world, possibly except for communications from the user's own cell phone, tablet or laptop. For example, the user may not want a sump pump to receive external communications, but would need to receive notifications on his mobile phone or laptop, for example, if the sump pump is not working properly. In some embodiments, the functions described above may be executed by apps residing on a single server, or two servers or on several different servers. Also, the apps may be configured to block certain traffic packets such as, for example, User Datagram Protocol (UDP) packets from infiltrating or exfiltrating the home network. For example, if a user is geofenced at her home based upon her mobile phone's GPS-determined location, then the app might block UDP packets from any home security cameras.

Also, in some embodiments, before the penetration test result is purged from the external server, it may be stored in a secure location on the user's mobile phone or on the user's key chain memory stick or stored in a memory stick, for example.

The invention claimed is:

1. A system for evaluating and improving the security of a local area network and a guest network associated with the local area network, the system comprising a server external to the guest network and the local area network and an application residing on the server, the server comprising a memory storing instructions and a processor configured to execute the instructions to cause the application to:
   receive a trigger with an Internet Protocol (IP) address of a router associated with the guest network from a user authorized to request a penetration test of the guest network, wherein the application requires that the user provides a password before initiating the penetration test of the guest network;
   obtain or create a list of all devices in communication with the router;
   conduct the penetration test of the guest network by interrogating each of the devices on the guest network to identify those devices that pose a security risk;
   report results of the interrogation of each of the devices on the guest network;
   perform one or both of the following tasks in response to identifying those devices on the guest network that pose a security risk:
      (1) undertake an action that improves the security of certain of the identified devices; or
      (2) recommend an action that would improve the security of certain of the identified devices;
      and
   calculate and report an Internet of Things readiness score for the guest network.

2. The system according to claim 1, wherein the local area network and the guest network are accessed through the same router.

3. The system according to claim 1, wherein the router associated with the guest network is separate from a router associated with the local area network.

4. The system according to claim 1, further comprising conducting a penetration test of the local area network.

5. The system according to claim 4, wherein the Internet of Things readiness score for the guest network is separate from an Internet of Things readiness score for the local area network.

6. The system according to claim 4, wherein the Internet of Things readiness score for the guest network is combined with an Internet of Things readiness score for the local area network to calculate a combined Internet of Things readiness score for the combination of the guest network and the local area network.

7. The system according to claim 1, wherein the penetration test is limited to a list of selected devices on the guest network.

8. The system according to claim 1, wherein the Internet of Things readiness score for the guest network is reported to an insurance company of a user of the local area network.

9. The system according to claim 8, wherein the insurance company modifies insurance rates of the user based on the Internet of Things readiness score.

10. A method executed on an external server comprising the steps of:
   receiving a request from a user to conduct a penetration test of a guest network associated with a local area network, said request including an Internet Protocol (IP) address of a router associated with the guest network from a user authorized to request a penetration test of the guest network, wherein the user is required to provide a password before the external server initiates the penetration test of the guest network;
   obtaining or creating a list of all devices in communication with the router;
   conducting the penetration test of the guest network by interrogating each of the devices on the guest network;

identifying each of the devices on the guest network that pose a security risk;

identifying any unauthorized devices having access to the guest network;

reporting the identification of devices that pose a security risk and taking at least one of the following actions:

(1) blocking access of unauthorized devices to the guest network;

(2) updating outdated firmware on one or more devices on the guest network; or (3) identifying devices that still carry their manufacturers' default administrator (Admin) passwords, and either changing the Admin password and storing the changed password in a password vault or recommending changing the Admin password;

and calculating and reporting an Internet of Things (IoT) readiness score for the guest network.

11. The method according to claim 10, wherein the local area network and the guest network are accessed through the same router.

12. The method of claim 10, wherein the router associated with the guest network is separate from a router associated with the local area network.

13. The method according to claim 10, further comprising:

conducting a penetration test of the local area network; and determining an Internet of Things readiness score for the local area network.

14. The method according to claim 13, wherein the Internet of Things readiness score for the guest network is combined with the Internet of Things readiness score for the local area network to calculate a combined Internet of Things readiness score for the combination of the guest network and the local area network.

15. The method according to claim 10, further comprising:

reporting the Internet of Things readiness score for the guest network to an insurance company of a user of the guest network; and wherein the insurance company modifies insurance rates of the user based on the Internet of Things readiness score.

16. A method for evaluating a combined Internet of Things (IoT) readiness score of a local area network and a guest network associated with the local area network, the method comprising:

receiving an Internet Protocol (IP) address of a router in the local area network at an external server with instructions to conduct a penetration test of the local area network from a person authorized to request the penetration test, wherein the person is required to provide a password before the external server initiates the penetration test of the local area network;

initiating at the external server the penetration test of the local area network, said penetration test comprising:

probing through the router to identify devices on the local area network;

identifying any vulnerabilities associated with any of the identified devices on the local area network;

evaluating the penetration test results of each of the identified devices;

providing a list of the identified devices to the external server together with the penetration test results for each of the identified devices;

calculating in the external server an IoT readiness score for the local area network based on the penetration test results;

receiving an IP address of a router associated with the guest network at the external server with instructions to conduct a penetration test of the guest network from a person authorized to request the penetration test, wherein the person is required to provide a password before the external server initiates the penetration test of guest network;

initiating at the external server the penetration test of the guest network, said penetration test comprising:

probing through the router associated with the guest network to identify devices on the guest network;

identifying any vulnerabilities associated with any of the identified devices on the guest network;

evaluating the penetration test results of each of the identified devices;

providing a list of the identified devices to the external server together with the penetration test results for each of the identified devices;

calculating in the external server an IoT readiness score for the guest network based on the penetration test results; and combining the IoT readiness score for the local area network with the IoT readiness score for the guest network to determine a combined IoT readiness score;

reporting the combined IoT readiness score to the person initiating the penetration tests; and recommending remedial action to correct any identified vulnerabilities associated with any of the identified devices on the local area network or the guest network.

17. The method according to claim 16, further comprising purging the combined IoT readiness score from the external server.

18. The method according to claim 16, wherein the method further comprises replacing certain vulnerable to hacking passwords with replacement passwords and storing such replacement passwords in a password vault.

19. The method according to claim 16, further comprising storing the combined IoT readiness score in a secure location external to both the external server and the local home network.

20. The method according to claim 16, further comprising identifying any of the devices that still have a default administrator (Admin) password and changing the default Admin password for those devices.

* * * * *